United States Patent Office 2,740,319
Patented Apr. 3, 1956

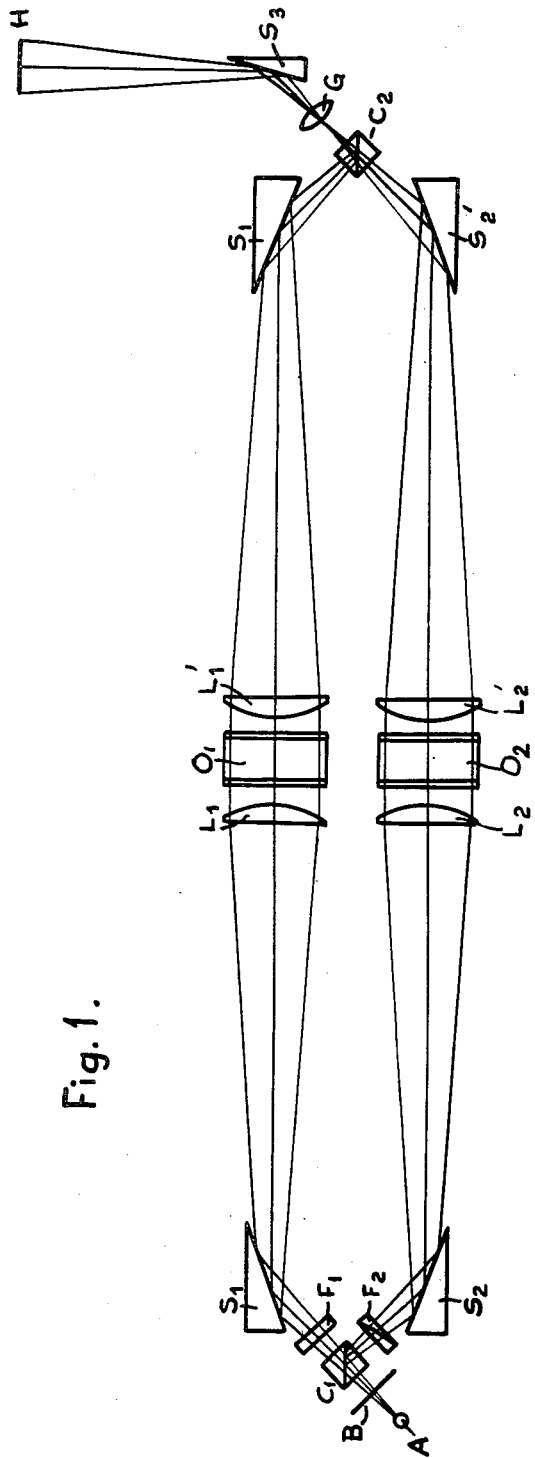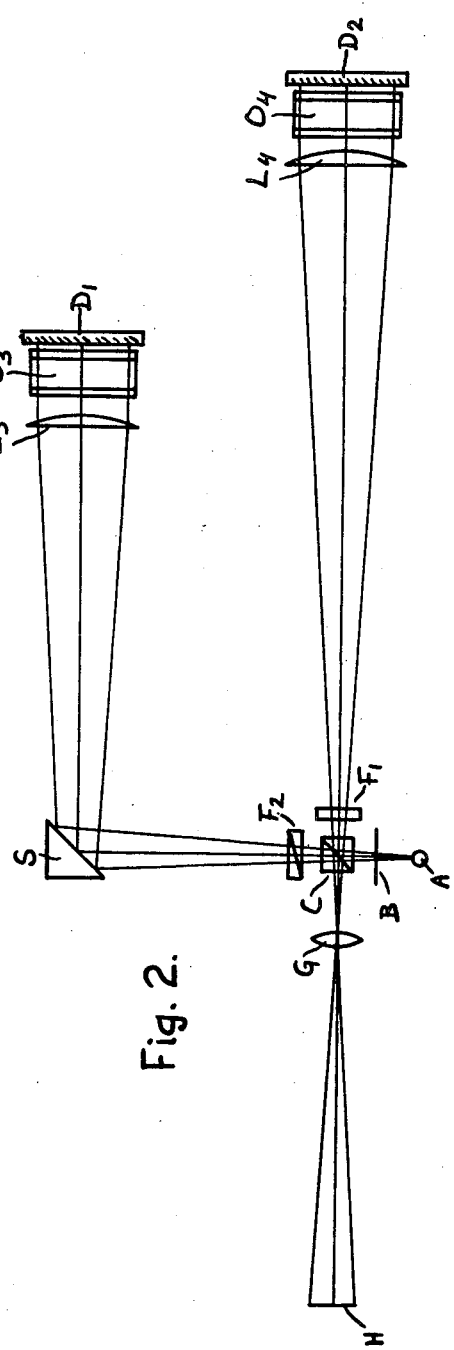

2,740,319

INTERFEROMETER FOR WIND TUNNELS

Svante Harry Svensson, Sundbyberg, Sweden, assignor to LKB-Produkter Fabriksaktiebolag, a Swedish company Application October 18, 1954, Serial No. 462,949

Claims priority, application Sweden November 7, 1953

3 Claims. (Cl. 88—14)

This invention pertains generally to apparatus for interferometric aerodynamic investigations in wind tunnels, and more particularly to an interferometric construction for large object fields which provides a complete symmetry with respect to the light-splitting foil for object and reference object as well as for all other components in the system, and provides that the entrance angle of the central ray against all phase boundaries at which refraction occurs shall in all directions be 0°.

For interferometric aerodynamic investigations in wind tunnels, Mach-Zehnder's interferometer has long been used. For such large object fields as are concerned in wind tunnels, such an interferometric construction with its four large mirrors and delicate adjusting devices becomes extremely expensive. The Mach-Zehnder interferometer has another disadvantage in that it requires collimated light from a nearly point-shaped light source, resulting in very low light intensity of the interferogram making it impossible to photograph rapid aerodynamic courses.

The ideal wind tunnel interferometer should satisfy the following conditions: (a) it should be characterized by a complete symmetry with regard to the light-splitting foil for object and reference object as well as for all other optical components in the arrangement, the only exception to this being constituted by reflexions in front-surface mirrors, which may be used in order to diminish the necessary space; and (b) the entrance angle of the central ray against all phase boundaries at which refraction occurs shall in all directions be 0° (in the absence of inclined glass plates). In order to avoid the disadvantages of the prior art and to provide an apparatus with ideal wind tunnel interferometer characteristics, the novel interferometer of this invention has been developed.

The requirement of symmetry concerns first the beam-splitting and -reuniting devices: the half-transparent film must not be on the other surface of a plate or a prism, but the device shall consist of a half-transparent foil which is supported by and in optical contact with two optical elements of transparent and homogeneous material and with well-defined outer boundary surfaces which are mutual mirror images with regard to the foil.

Since such a beam-splitting device permits the use of oblique pencils, it can either be placed in collimated light from an extended light source, or in non-collimated, divergent or convergent light. When as in this case large object fields are concerned, the latter arrangement is of course much to be preferred, since the device can be placed near the light source and be made in a considerably smaller size than otherwise. If it is to be put into a collimated beam of light, it naturally has to be as large as the object field.

As a matter of principle, nothing prevents that the collimation be completely excluded, and two as nearly as possible identical concave mirrors may be placed behind object and reference object, with the light source in their common centre of curvature. As is well known, the mirrors are achromatic, and their spherical aberration for as nearly radial rays as in such an arrangement is very small. The unimportant spherical aberration is further eliminated in the interferogram due to the fact that one has the same aberration in both light paths. An unavoidable small difference in radius of curvature can be compensated by using two optical compensators in the two light paths, in one a plano-parallel plate, in the other a double wedge with relatively to each other displaceable wedges, which act as a plate with a continuously variable thickness.

If one cannot tolerate that the light goes obliquely through the peripheral parts of the object field, one must collimate the light by using lenses as large as the object field. In the design of these lenses it is, with reference to what has been pointed out above, more important to provide that they become as identical as possible than to carry out a perfect optical correction. An unavoidable small difference in focal distance and thickness can be compensated in the manner mentioned for the concave mirrors.

Two possible embodiments of my invention are shown on the drawing. Fig. 1 illustrates the embodiment with two collimating lenses in each light path, and Fig. 2 illustrates the embodiment with auto-collimation in each light path. A is a lamp, either an ordinary white incandescent or a vapour discharge lamp with a line spectrum. Its radiant body must not necessarily be point-shaped, but can be extended, hence a considerable light intensity can be made available by the choice of a sufficiently strong lamp. If a lamp with a line spectrum is used, the filter B assorts one single wave-length from this spectrum. C is the beam-splitting or -reuniting device, respectively, which in this case consists of two 45, 45, 90°–prism, one of which is half-foiled on its hypotenuse surface, after which the other one is cemented to it along the same surface. $D_1$ and $D_2$ are plane mirrors. $F_1$ is a small plane glass, and $F_2$ is a double wedge which serves as an optical compensator. G is the image-forming objective, which on a light-indicating device H, such as a photographic plate, gives an optic image of the object chambers or of the mirrors placed behind them. $L_1$, $L_2$ and $L_1'$ and $L_2'$ are collimating lenses, and S, $S_1$, $S_2$, $S_3$, $S_1'$ and $S_2'$ are front surface mirrors. $O_1$ and $O_4$ are the objects, and $O_2$ and $O_3$ are the reference objects.

In Fig. 1 two collimating lenses are used in each light path, and thus we have parallel light passing through the chambers of the object $O_1$ and the reference object $O_2$. Technically unavoidable small differences in optical distance between the two light paths, which are caused by differences in focal length and thickness of the lenses, are compensated by displacement of one component of the doube wedge $F_2$. The plane plate $F_1$ has the same thickness as the double wedge in its symmetric position. The front surface mirrors $S_1$ and $S_2$ make the central rays in the two beams parallel, and the mirrors $S_1'$ and $S_2'$ direct the convergent beams in towards the beam-reuniting device $C_2$. A fifth mirror $S_3$ diminishes the necessary longitudinal space by throwing the light perpendicularly to the main direction of the light.

In Fig. 2 auto-collimation is used with two plane mirrors $D_1$ and $D_2$, and only one device C, serving both as a beam-splitter and a reuniter. The bending of one light path at an angle by the aid of the mirror S shows that the symmetry requirement need not be extended to reflexions in front surface mirrors.

What I claim is:

1. An interferometer comprising means for producing a beam of divergent light, means including a half-transparent foil for splitting said beams of divergent light into two coherent beams of divergent light, means for transforming said two coherent beams of divergent light into two coherent beams of parallel light, one test object situated in one of the coherent beams of parallel light, one reference object situated in the other coherent beam of parallel light, means for transforming the two coherent beams of parallel light, after having passed the objects, into two coherent beams of convergent light, means for reuniting said two coherent beams of converging light into one beam of converging light, and a light registering means arranged so as to receive said beam of converging light.

2. An interferometer as defined in claim 1, in which the means for transforming each one of said two coherent beams of divergent light into parallel light, and for transforming said parallel light into convergent light, comprises two lenses enclosing said object.

3. An interferometer as defined in claim 1, in which the means for transforming each one of said two coherent beams of divergent light into parallel light, and for transforming said parallel light into convergent light, comprises one lens arranged closely in front of said object and a plane mirror arranged closely behind said object, the means for reuniting the two coherent beams of converging light being the same as the means for splitting the beam of divergent light.

References Cited in the file of this patent

UNITED STATES PATENTS

| | | |
|---|---|---|
| 2,434,029 | Williams | Jan. 6, 1948 |

FOREIGN PATENTS

| | | |
|---|---|---|
| 355,911 | Great Britain | Sept. 3, 1931 |
| 595,211 | Germany | Apr. 12, 1934 |
| 919,843 | France | Dec. 16, 1946 |